United States Patent
Kirsch

(10) Patent No.: US 10,508,936 B2
(45) Date of Patent: Dec. 17, 2019

(54) APPARATUS AND METHOD FOR RELIABLY DETERMINING THE POSITION OF AN OBJECT

(71) Applicant: Pepperl+Fuchs GmbH, Mannheim (DE)

(72) Inventor: Martin Kirsch, Heddesheim (DE)

(73) Assignee: Pepperl+Fuchs GmbH, Mannheim (DE)

( * ) Notice: Subject to any disclaimer, the term of this patent is extended or adjusted under 35 U.S.C. 154(b) by 101 days.

(21) Appl. No.: 15/744,300

(22) PCT Filed: Sep. 15, 2015

(86) PCT No.: PCT/EP2015/071086
§ 371 (c)(1),
(2) Date: Jan. 12, 2018

(87) PCT Pub. No.: WO2017/045704
PCT Pub. Date: Mar. 23, 2017

(65) Prior Publication Data
US 2018/0209823 A1  Jul. 26, 2018

(51) Int. Cl.
*G01D 5/347* (2006.01)
*B66C 13/46* (2006.01)
(Continued)

(52) U.S. Cl.
CPC .......... *G01D 5/34746* (2013.01); *B66C 11/00* (2013.01); *B66C 13/46* (2013.01); *G01D 5/34792* (2013.01); *B66C 13/16* (2013.01)

(58) Field of Classification Search
CPC .......... G01D 5/26; G01D 5/262; G01D 5/32; G01D 5/34; G01D 5/342; G01D 5/347;
(Continued)

(56) References Cited

U.S. PATENT DOCUMENTS 3,842,923 A * 10/1974 Moore .................. G01G 19/06
                                                        177/163
4,363,369 A * 12/1982 Susor .................. G01G 3/1402
                                                        177/145
(Continued)

FOREIGN PATENT DOCUMENTS

DE          29520980 U1   6/1996
DE    202007012798 UI    2/2009

OTHER PUBLICATIONS

International Searching Authority, International Search Report and Written Opinion for International Application No. PCT/EP2015/071086, dated Jun. 6, 2016, 8 pages, European Patent Office, Netherlands.

(Continued)

*Primary Examiner* — John R Lee
(74) *Attorney, Agent, or Firm* — Alston & Bird LLP

(57) ABSTRACT

For providing a reliable determination of the position of an object (1) regarding a relative movement between the object (1) and a path (2) an apparatus is provided comprising: a detector (3) attached to or integrated in the object (1), at least one marker (4) being located along the path (2), wherein the at least one marker (4) is detected by the detector (3) within its spatial detection range (5) for determining the position of the object (1) relative to the marker (4), characterized by generating means for providing a definable signal or signal sequence or graphic representation (7, 8) or graphic representation sequence, wherein said signal or signal sequence or graphic representation (7, 8) or graphic representation sequence is detected by the detector (3) within its spatial detection range (5), and by evaluating means (6) for verifying a coincidence or relationship of the provided signal or signal sequence or graphic representation (7, 8) or graphic representation sequence with corresponding data detected (Continued)

by the detector (3). Further, a corresponding method is claimed.

8 Claims, 5 Drawing Sheets

(51) Int. Cl.
*B66C 11/00* (2006.01)
*B66C 13/16* (2006.01)

(58) Field of Classification Search
CPC .......... G01D 5/34707; G01D 5/34715; G01D 5/34746; G01D 5/34776; G01D 5/34784; G01D 5/34792; G06K 7/12; B66C 11/00; B66C 11/12; B66C 13/16; B66C 13/18; B66C 13/46
See application file for complete search history.

(56) References Cited

U.S. PATENT DOCUMENTS

| 8,385,594 | B2* | 2/2013 | Hofmann | B66C 13/46 |
| | | | | 382/103 |
| 9,354,070 | B2* | 5/2016 | Thomson | B66F 9/063 |
| 2005/0169501 | A1* | 8/2005 | Fujii | G06K 9/00798 |
| | | | | 382/104 |
| 2006/0038895 | A1* | 2/2006 | Suzuki | B60R 1/00 |
| | | | | 348/222.1 |
| 2008/0099666 | A1 | 5/2008 | Masada et al. | |
| 2009/0067673 | A1 | 3/2009 | Hofmann et al. | |
| 2014/0265878 | A1* | 9/2014 | Gritti | H04B 10/116 |
| | | | | 315/153 |
| 2014/0348379 | A1* | 11/2014 | Kraegeloh | G06F 3/0321 |
| | | | | 382/103 |
| 2018/0209823 | A1* | 7/2018 | Kirsch | B66C 13/46 |

OTHER PUBLICATIONS

European Patent Office, Communication pursuant to Article 94(3) EPC for Application No. 15778619.5, dated Mar. 14, 2018, 6 pages, Germany.

* cited by examiner

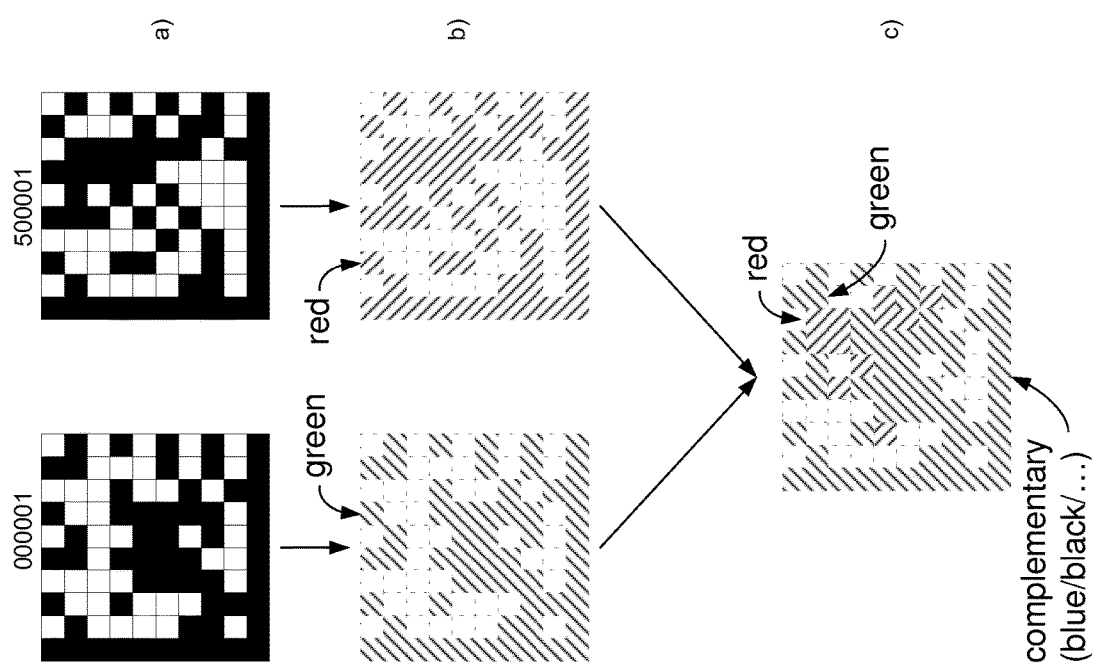

APPARATUS AND METHOD FOR RELIABLY DETERMINING THE POSITION OF AN OBJECT

CROSS REFERENCE TO RELATED APPLICATIONS

This application is a National Stage Application, filed under 35 U.S.C. § 371, of International Application No. PCT/EP2015/071086, filed Sep. 15, 2015; the contents of which as are hereby incorporated by reference in their entirety.

BACKGROUND

Related Field

The present invention relates to an apparatus for reliably determining the position of an object regarding a relative movement between the object and a path, comprising: a detector attached to or integrated in the object, at least one marker being located along the path, wherein the at least one marker is detected by the detector within its spatial detection range for determining the position of the object relative to the marker.

Further, the present invention relates to a method for reliably determining the position of an object regarding a relative movement between the object and a path, wherein a detector is attached to or integrated in the object, wherein at least one marker is located along the path, and wherein the at least one marker is detected by the detector within its spatial detection range for determining the position of the object relative to the marker.

Description of Related Art

An apparatus and a method for reliably determining the position of an object is known from US 2009/0067673 A1. This document shows an apparatus and a method for reliably determining the position of an object regarding a relative movement between the object and a path. Particularly, an object in the form of a vehicle moves along a path, wherein a detector in the form of a camera is attached to the object and a plurality of markers in the form of code elements is located along the path. The markers are detected by the camera within its spatial detection range for determining the position of the vehicle relative to the markers.

The known apparatus and method are frequently applied within different industrial fields wherein the determination of the position of the object regarding a relative movement between the object and the path is very important for a reliable industrial process. Thus, it is an object for developers of such apparatuses and methods to enhance the level of reliability of such apparatuses and methods. If, for example, the detector or camera does not work correctly, errors regarding the position determination can arise with sometimes significant problems or risks of damages for users or equipment.

There exist enhancements of known apparatuses and methods comprising a second detector or camera for verifying correct function of a first detector or camera. Such second detectors or cameras reveal functional errors of the first detector or camera, such as a frozen image or a hanging up of corresponding analyzing or processing software of the first detector or camera.

However, such a solution with a second detector or camera for providing a redundant monitoring channel is costly and needs a lot of mounting space.

BRIEF SUMMARY

Thus, it is an object of the present invention to improve and further develop an apparatus and a method for reliably determining the position of an object for providing a reliable determination of the position of an object regarding a relative movement between the object and a path by cost effective and space-saving means.

In accordance with the invention, the aforementioned object is accomplished by an apparatus comprising the features of claim 1. The inventive apparatus is characterized by generating means for providing a definable signal or signal sequence or graphic representation or graphic representation sequence, wherein said signal or signal sequence or graphic representation or graphic representation sequence is detected by the detector within its spatial detection range, and by evaluating means for verifying a coincidence or relationship of the provided signal or signal sequence or graphic representation or graphic representation sequence with corresponding data detected by the detector.

Further, the aforementioned object is accomplished by an inventive method that is characterized in that a definable signal or signal sequence or graphic representation or graphic representation sequence is provided by generating means, wherein said signal or signal sequence or graphic representation or graphic representation sequence is detected by the detector within its spatial detection range, and that a coincidence or relationship of the provided signal or signal sequence or graphic representation or graphic representation sequence with corresponding data detected by the detector is verified by evaluating means.

According to the invention it has first been recognized that it is not necessary to use a second detector or camera for providing an enhanced reliability regarding the determination of the position of the object. Further, it has been recognized that the provision of generating means for providing a definable signal or signal sequence or graphic representation or graphic representation sequence forms the basis for solving the above object in a smart way. Said provided signal or signal sequence or graphic representation or graphic representation sequence can be detected by the detector within its spatial detection range. By means of suitable evaluating means a coincidence or relationship of the provided signal or signal sequence or graphic representation or graphic representation sequence with corresponding data detected by the detector can be verified. Thus, functioning of the detector or camera can be verified by evaluation of an additional signal or signal sequence or graphic representation or graphic representation sequence provided by said generating means. If an image of the detector or camera is frozen or if a software has hung up no corresponding data will be detected by the detector and the detector can be qualified as malfunctioning or not functioning. Corresponding maintenance activities could be initiated in such a situation.

Thus, by means of the inventive apparatus and method a reliable determination of the position of an object regarding a relative movement between the object and a path is provided by cost effective and space-saving means, as provision of an additional detector or camera can be avoided.

In a preferred embodiment the signal or signal sequence provided by the generating means can be an optical or acoustical signal or signal sequence. The signal or signal sequence has to be adapted to the detection ability of the detector and can depend on individual application situations. Within a further preferred embodiment a graphic representation or graphic representation sequence can be provided by the generating means for providing a very sophisticated and diverse input for the detector. Such a graphic representation or graphic representation sequence can comprise a code, code sequence, binary code, bar code or data matrix code or a combination or superposition thereof. Such a graphic representation or graphic representation sequence can be further diversified by different colours of the individual graphic representation or of a part of the graphic representation. Preferably, a data matrix code can be provided by superposition of at least two data matrix codes having different colours, for example red and green. Very individual graphic representations can be provided by such combinations or superpositions.

Regarding a very effective and reliable evaluation of a coincidence or relationship of a provided signal or graphic representation with corresponding data detected by the detector the generating means can comprise at least one light source emitting at least one definable light colour or light colour spectrum for illuminating a correspondingly coloured graphic representation or graphic representation sequence, so that depending on the at least one illuminating light colour or light colour spectrum the graphic representation or a part of the graphic representation is visible by the detector with a predefinable intensity and/or colour or not. If, for example, the light source emits red light, a red coloured graphic representation is nearly not visible by the detector and a green coloured graphic representation will be detected as a dark representation. If the graphic representation comprises red and green parts, only the green parts will be detected. Thus, depending on the illuminating light colour only a part of the graphic representation is visible by the detector.

Regarding a very simple and cost effective realization of the inventive apparatus and method the coloured graphic representation or graphic representation sequence and the at least one marker are identical. In other words, the already provided at least one marker can be used as graphic representation to be detected by the detector, if a corresponding light colour or light colour spectrum is emitted by the at least one light source. By suitable selection of the emitted light colour or light colour spectrum detectable parts of the marker can be varied by the selected illumination light colour. Such a variation of detectable parts and/or of the detectable intensity is used for verifying the functionality of the detector. No additional graphic representations have to be provided, as the already present markers are used within such an embodiment.

For realizing a very reliable verification of the functionality of the detector the generating means can comprise a control unit for defining an illumination sequence of the at least one light source for providing a change of visibility of the graphic representation or of a part of the graphic representation by the detector. Concretely, the control unit can define an individual illumination time schedule for providing an illumination sequence with predefined illumination durations and illumination breaks. Thus, a very selective illumination sequence can be provided by the generating means.

Within a preferred embodiment the generating means can comprise a control unit for defining the at least one light colour or light colour spectrum of the at least one light source. By means of such a control unit the light colour or light colour spectrum can be verified during an illumination or illumination sequence.

Generally, the illumination or illumination sequence by the at least one light source can be provided after definable time intervals for providing a functionality check of the detector periodically.

Within a further preferred embodiment the evaluating means can be designed for providing a control signal, an indication or an activity depending on the result of the verifying process. If the verifying process indicates that the detector is reliably functioning, the evaluating means can provide a corresponding positive control signal or indication to monitoring users. Usually, a further activity is not necessary in this case, as the apparatus functions in the necessary way. However, if the result of the verifying process is a malfunctioning or not functioning detector, a warning control signal or indication can be provided so that monitoring users can react accordingly by possibly stopping the apparatus or method. A provided activity can be for example a breaking process for the relative movement between the object and path.

Depending on the individual situation the control signal can be an optical, acoustical or electronic control signal. An optical signal could be a warning illumination. An acoustical signal could be an alarm horn. An electronic control signal could be an electric or electronic pulse which can be provided to further electronic or mechanical equipment.

Within a preferred embodiment the detector can be a digital camera, a CCD sensor or any other suitable optical sensor.

Within a concrete embodiment the object can be a vehicle moving relative to a path. In this context, it is emphasized that the position determination of the object according to the invention means a position of the object regarding a relative movement between the object and a path. In other words the object can move relative to the path or the path can move relative to the object. For example, a rotating shaft can be provided with markers which can be detected by a non moving detector attached to a fixed object or frame. Within this embodiment the position of the object relative to the rotating shaft can be determined.

Within a further embodiment the at least one marker can comprise a code, code sequence, binary code, bar code or data matrix code or a combination or superposition thereof. Such types of markers can additionally be used for providing the definable signal or signal sequence or graphic representation or graphic representation sequence as mentioned before. Other types of markers can also be used within embodiments of the present invention.

BRIEF DESCRIPTION OF THE FIGURES

There are several ways how to design and further develop the teaching of the present invention in an advantageous way. To this end it is to be referred to the patent claims subordinate to patent claim 1 on the one hand and to the following explanation of preferred embodiments of the invention, by way of example, illustrated by the figures on the other hand. In connection with the explanation of the preferred embodiments of the invention by the aid of the figures, generally preferred embodiments and further developments of the teaching will be explained. In the drawing FIG. 4 is a schematic view of another embodiment of a graphic representation for the generating means and FIG. 5 is a diagram showing a possible superposition of two coloured data matrix codes for use with a generating means according to the invention.

DETAILED DESCRIPTION OF VARIOUS EMBODIMENTS

Figure 1:
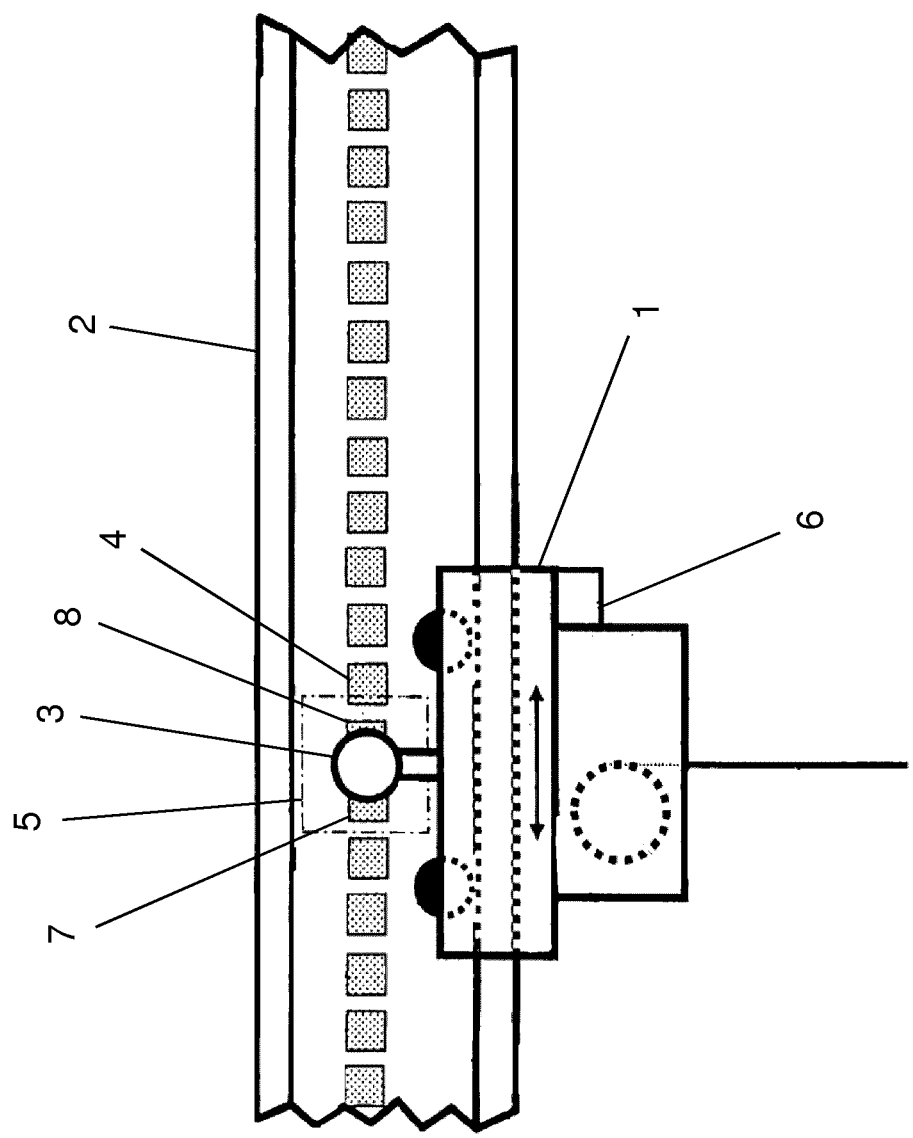
FIG. 1 is a schematic view of an embodiment of an apparatus according to the invention.

FIG. 1 shows a schematic view of an embodiment of an apparatus for reliably determining the position of an object 1 regarding a relative movement between the object 1 and a path 2 according to the invention. The object 1 of this embodiment is a vehicle designed for movement along a path 2. A detector 3 is attached to the object 1 and a plurality of markers 4 is located along the path 2. The markers 4 are realized by data matrix codes positioned along the path 2. The markers 4 are detected by the detector 3 within its spatial detection range 5 for determining the position of the object 1 relative to the markers 4. The detector 3 is a digital camera.

Figure 2:
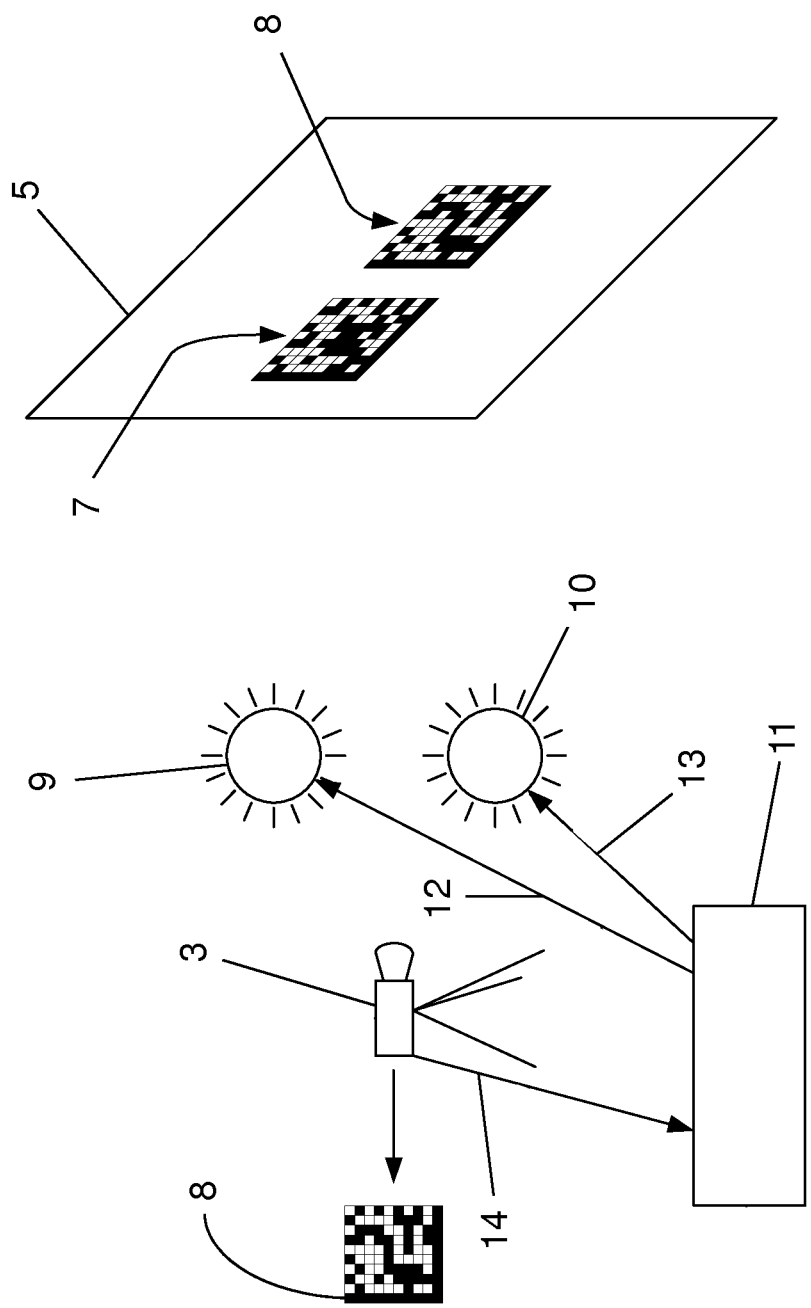
FIG. 2 is a schematic and partly perspective view of generating means for the embodiment of FIG. 1.

For providing a reliable determination of the position of the object 1 regarding relative movement to the path 2 by cost effective and a space-saving means a generating means for providing definable graphic representations 7, 8 is provided which is shown in a schematic view in FIG. 2.

FIG. 2 shows said generating means which comprises two light sources 9, 10 emitting a definable light colour for illuminating the correspondingly coloured graphic representations 7, 8, so that depending on the light colour the graphic representation 7, 8 is visible by the detector 3 with a predefinable intensity and/or colour or not. The detector 3 shown within FIG. 2 is the digital camera 3 which is shown in FIG. 1 attached to the object 1.

The graphic representations 7, 8 according to FIG. 2 are also indicated within FIG. 1 within the detection range 5 of the detector 3. The light sources 9 and 10 are not shown within FIG. 1, but can be attached to or integrated in the object 1. The light sources 9 and 10 can also be realized within one single illumination module.

The graphic representations 7 and 8 are coloured in different colours, so that depending on the illuminating light colours provided by the light sources 9 and 10 one or both of the graphic representations 7, 8 are visible by the detector 3 or not.

According to the embodiment of FIG. 2 the graphic representations 7 and 8 are realized by data matrix codes wherein said graphic representation 7 is red and the graphic representation 8 is green, for example, wherein the illustration according to FIG. 2 is only showing black regions on a white background.

The graphic representations 7 and 8 are detected by the detector 3. Light source 9 provides red light and light source 10 provides green light. If light source 9 is activated with its red light, the graphic representation 8 is detected as dark illustration or as illustration with low intensity, as the red light will be absorbed from the green colour of representation 8. Representation 7 is nearly invisible for the detector 3 in this case, as nearly the complete red light will be reflected. In this case detector 3 detects only representation 8, as indicated within FIG. 2. If light source 10 is activated with its green illumination, the red representation 7 is visible and the green representation 8 disappears. In this case detector 3 detects representation 7.

The selection of the illumination is realized by a control unit 11 which can define an illumination sequence of the light sources 9, 10 for providing a change of visibility of the graphic representations 7, 8 by the detector 3. Control unit 11 selects the illumination sequence according to a predefined schedule via control lines 12 and 13. Depending on an illumination by light source 9 or 10 the detector 3 informs the control unit 11 regarding the detected representations 7 or 8 via line 14 and/or transmits the detected representation 7 or 8 via line 14 to the control unit 11. The detector 3 receives no information regarding the provided illumination colour and detects only the situation within its detection range 5. The control unit 11, however, has the information of the performed illumination sequence and compares the detection result by detector 3 with the expected result. The control unit 11 comprises respecting evaluating means 6 for verifying a coincidence or relationship of the provided graphic representations 7 or 8 with corresponding data detected by the detector 3. Thus, the control unit 11 with its evaluating means 6 can verify, whether the software within detector 3 is still correctly functioning or is possibly frozen or hung up or has a time shift/delay.

Thus, on the basis of the illustrated embodiment of the invention a verification regarding correct functionality of the detector 3 is possible with the same detector 3. Provision of a second detector 3 is not necessary for significantly enhancing the reliability of a position determination of the object 1 on the basis of information collected by the single detector 3. The evaluating means 6 can be realized as a separate element or can be realized as a combined module together with control unit 11. For providing a reliable position determination the detector 3 comprises suitable image processing software.

Detector 3 is typically a grayscale camera. However the use of a colour camera is also possible.

Figure 3:
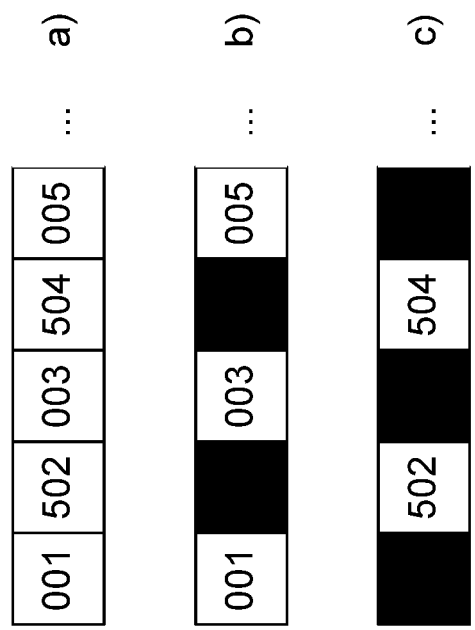
FIG. 3 is a schematic view of various embodiments of graphic representations for the generating means.
Figure 4:
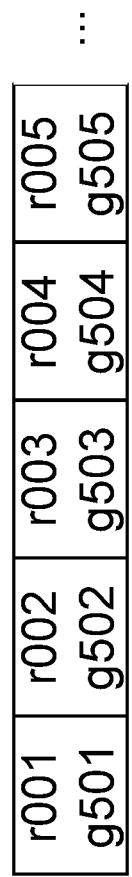

FIGS. 3 and 4 show various possible graphic representations for use as markers 4 and as graphic representations being suitable for use with the generating means.

FIG. 3a) shows a suitable arrangement of codes for positioning systems. These codes comprise an increasing position indication. However, each second code is increased with a position offset, here 500. These codes are coloured alternately with two suitable colours, for example, red and green. The different colours are represented by different hatching patterns. Thus, depending on the light colour of the illumination—red or green, for example—an image according to b) or an image according to c) is the result. A positioning determination apparatus can determine a unique position in both cases. However, the position differs regarding the position offset. A suitable control unit 11, which knows the actual illumination, can provide a suitable evaluation and can subtract the offset, so that the same position results under use of the evaluation.

The above code arrangement according to FIG. 3 has the problem that the respective codes have a significant distance from each other due to the offset.

Position gaps are provided by the dark regions within b) and c). This can result in a deterioration regarding the positioning performance. This problem can be avoided by a code arrangement according to FIG. 4. In this case no position gaps are present. The character "r" indicates the colour red and the character "g" indicates the colour green. As a result a red illumination provides visibility of the codes 501, 502, . . . and green illumination provides visibility of the codes 001, 002, . . . .

A further example of a graphic representation being useful in connection with the generating means is shown within FIG. 5. Codes 000001 and 500001 are shown as data matrix codes. Code 000001 shall be visible with red illumination. In FIG. 5a) both codes are illustrated. Code 000001 is coloured green and code 500001 is coloured red according to FIG. 5b). Within FIG. 5c) both codes are superposed. If a part of said superposition shall be dark—visible—under red and also under green illumination, this part is coloured in the complementary colour or in a colour which is dark for both illumination colours.

The above mentioned colours are only examples. Within a further embodiment the background of the representations can be realized by a colour being complementary—blue, black, . . . —to the colours of the representation. In this case, the detection result is interchanged. The reason is that a red code is bright under red illumination. The green code, however, is detected as dark region like the background. Thus, the codes will be detected inversely within the detector or camera. The advantage of this embodiment is the fact, that the adaptation of the light sources to the colours is not so relevant. Usually, the respective other code is detected as dark region on a bright background, if the background is blue, wherein such a blue background is the complementary colour to red and green. Usually, this can be clearly distinguished by a camera.

The illustrated embodiment is based on a data matrix code. However, this embodiment is also applicable to all binary codes in the same way, for example bar codes, QR-codes and shotcodes.

On the basis of embodiments of the invention a control channel regarding the functionality of the detector can be realized, wherein an already present channel in the form of the position determining channel is used. In this way a simultaneous backward or feedback channel is provided by predefinable manipulation of the illumination of a graphic representation, for example. Generally, the functionality of the detector can be verified anytime.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

LIST OF REFERENCE SIGNS 1 object
2 path
3 detector
4 marker
5 detection range
6 evaluating means
7 graphic representation
8 graphic representation
9 light source
10 light source
11 control unit
12 control line
13 control line
14 line

The invention claimed is:

1. Apparatus for reliably determining the position of an object (1) regarding a relative movement between the object (1) and a path (2), the apparatus comprising:
   a detector (3) attached to or integrated in the object (1),
   at least one marker (4) located along the path (2),
   generating means for providing a definable graphic representation (7, 8) or graphic representation sequence, and
   evaluating means (6) for verifying a coincidence or relationship of the provided graphic representation (7, 8) or graphic representation sequence with corresponding data detected by the detector (3) for verifying whether a software within the detector (3) is correctly functioning, is frozen or hung, or has a time shift or delay,
   wherein:
   the at least one marker (4) is detected by the detector (3) within its spatial detection range (5) for determining the position of the object (1) relative to the marker (4),
   said graphic representation (7, 8) or graphic representation sequence is detected by the detector (3) within its spatial detection range (5);
   the generating means comprise at least one light source (9, 10) emitting at least one definable light color or light color spectrum for illuminating a correspondingly colored graphic representation (7, 8) or graphic representation sequence provided by the generating means, such that dependent on the at least one illuminating light color or light color spectrum, the graphic representation (7, 8) or a part of the graphic representation is either: visible by the detector (3) with at least one of a predefined intensity or color, or not visible by the detector (3); and
   the colored graphic representation (7, 8) or graphic representation sequence and the at least one marker (4) are identical and are realized by a data matrix code or data matrix codes.

2. Apparatus according to claim 1, wherein the generating means comprise a control unit (11) for defining an illumination sequence of the at least one light source (9, 10) for providing a change of visibility of the graphic representation (7, 8) or of a part of the graphic representation by the detector (3).

3. Apparatus according to claim 1, wherein the generating means comprise a control unit (11) for defining the at least one light colour or light colour spectrum of the at least one light source (9, 10).

4. Apparatus according to claim 1, wherein the evaluating means (6) are designed for providing a control signal, an indication or an activity depending on the result of the verifying process.

5. Apparatus according to claim 4, wherein the control signal is an optical, acoustical or electronic control signal.

6. Apparatus according to claim 1, wherein the detector (3) is a camera.

7. Apparatus according to claim 1, wherein the object (1) is a vehicle.

8. Method for reliably determining the position of an object (1) regarding a relative movement between the object (1) and a path (2), particularly performed by an apparatus according to claim 1, wherein:
   a detector (3) is attached to or integrated in the object (1),
   at least one marker (4) is located along the path (2),
   the at least one marker (4) is detected by the detector (3) within its spatial detection range (5) for determining the position of the object (1) relative to the marker (4),
   a definable graphic representation (7, 8) or graphic representation sequence is provided by generating means,
   said graphic representation (7, 8) or graphic representation sequence is detected by the detector (3) within its spatial detection range (5),
   a coincidence or relationship of the provided graphic representation (7, 8) or graphic representation sequence with corresponding data detected by the detector (3) is verified by evaluating means for verifying whether a software within the detector (3) is correctly functioning, is frozen or hung, or has a time shift or delay, the generating means comprise at least one light source (9, 10) emitting at least one definable light color or light color spectrum for illuminating a correspondingly colored graphic representation (7, 8) or graphic representation sequence provided by the generating means, such that dependent on the at least one illuminating light color or light color spectrum the graphic representation (7, 8) or a part of the graphic representation is either: visible by the detector (3) with at least one of a predefined intensity or color, or not visible by the detector (3), and the colored graphic representation (7, 8) or graphic representation sequence and the at least one marker (4) are identical and are realized by a data matrix code or data matrix codes.

* * * * *